(12) United States Patent
Xu et al.

(10) Patent No.: US 10,739,633 B2
(45) Date of Patent: Aug. 11, 2020

(54) COLOR FILTER SUBSTRATE

(71) Applicant: WUHAN CHINA STAR OPTOELECTRONICS TECHNOLOGY CO., LTD., Wuhan, Hubei (CN)

(72) Inventors: Haile Xu, Hubei (CN); Shunjie Shen, Hubei (CN); Jiangjiang Song, Hubei (CN)

(73) Assignee: WUHAN CHINA STAR OPTOELECTRONICS TECHNOLOGY CO., LTD, Wuhan (CN)

( * ) Notice: Subject to any disclaimer, the term of this patent is extended or adjusted under 35 U.S.C. 154(b) by 498 days.

(21) Appl. No.: 15/539,821

(22) PCT Filed: May 9, 2017

(86) PCT No.: PCT/CN2017/083611
§ 371 (c)(1),
(2) Date: Jun. 26, 2017

(87) PCT Pub. No.: WO2018/176580
PCT Pub. Date: Oct. 4, 2018

(65) Prior Publication Data
US 2019/0391443 A1 Dec. 26, 2019

(30) Foreign Application Priority Data
Mar. 30, 2017 (CN) .......................... 2017 1 0199671

(51) Int. Cl.
*G02F 1/1335* (2006.01)
(52) U.S. Cl.
CPC .. *G02F 1/133514* (2013.01); *G02F 1/133512* (2013.01)

(58) Field of Classification Search
CPC .................. G02F 1/133512; G02F 1/133514
See application file for complete search history.

(56) References Cited

U.S. PATENT DOCUMENTS

| 2008/0117378 | A1* | 5/2008 | Son | G02F 1/133512 349/155 |
| 2014/0240650 | A1* | 8/2014 | Motooka | G02F 1/133512 349/110 |
| 2018/0307094 | A1* | 10/2018 | Chen | G02F 1/133514 |

FOREIGN PATENT DOCUMENTS

| CN | 101498802 A | 8/2009 |
| CN | 104730760 A | 6/2015 |

(Continued)

OTHER PUBLICATIONS

International Search Report and Written Opinion for International Application No. PCT/CN2017/083611, dated May 9, 2017.

(Continued)

*Primary Examiner* — Jessica M Merlin

(57) ABSTRACT

Provided is a color filter substrate, including a plurality of pixel unit regions arranged in an array. Each of the pixel unit regions has a first sub-pixel region, a second sub-pixel region, and a third sub-pixel region, which are respectively provided thereon with a red color barrier, a green color barrier, and a blue color barrier. In at least one of the pixel unit regions, thickness of a color barrier provided on a sub-pixel region corresponding to color of a specific color barrier is larger than thickness of a color barrier provided on a sub-pixel region corresponding to color of each of other two color barriers.

8 Claims, 2 Drawing Sheets

(56) References Cited

FOREIGN PATENT DOCUMENTS

| | | | |
|---|---|---|---|
| CN | 204405885 A | | 6/2015 |
| CN | 204405885 U | * | 6/2015 |
| CN | 105259693 A | * | 1/2016 |
| CN | 105259693 A | | 1/2016 |
| CN | 106349465 A | | 12/2016 |
| JP | 2007-052369 A | | 3/2007 |

OTHER PUBLICATIONS

Chinese Office Action and Search Report for Chinese Patent Application No. 201710199671.9, dated Aug. 27, 2018.

* cited by examiner

COLOR FILTER SUBSTRATE

CROSS-REFERENCE TO RELATED APPLICATIONS

The present application claims the priority of Chinese patent application CN 201710199671.9, entitled "Color filter substrate" and filed on Mar. 30, 2017, the entirety of which is incorporated herein by reference.

FIELD OF THE INVENTION

The present disclosure relates to the technical field of display panels, and in particularly, to a color filter substrate.

BACKGROUND OF THE INVENTION

With the development of display technologies, liquid crystal display devices have become most commonly seen display devices.

A display panel of the liquid crystal display device includes a plurality of pixel unit regions arranged in an array. A conventional pixel unit region usually includes three sub-pixel regions of three colors of red, green, and blue color barriers, which can produce only three primary colors of red, green, and blue, such that a color gamut range is narrow. As shown in FIG. 1, triangular and polygonal regions therein correspond to gamut of the three primary colors of red, green, and blue.

SUMMARY OF THE INVENTION

In order to solve the above problem, the present disclosure provides a color filter substrate, for increasing color gamut of a color filter substrate and balancing color shift.

According to one embodiment of the present disclosure, a color filter substrate is provided, comprising a plurality of pixel unit regions arranged in an array, each of the pixel unit regions including a first sub-pixel region, a second sub-pixel region, and a third sub-pixel region, which are respectively provided thereon with a red color barrier, a green color barrier, and a blue color barrier, wherein in at least one of the pixel unit regions, thickness of a color barrier provided on a sub-pixel region corresponding to color of a specific color barrier is larger than thickness of a color barrier provided on a sub-pixel region corresponding to color of each of other two color barriers.

In one specific embodiment of the present disclosure, each of the pixel unit regions further comprises a fourth sub-pixel region, which includes two secondary sub-pixel regions, provided thereon with color barriers having different colors from each other and from a color barrier having a largest thickness in the pixel unit region.

Preferably, the first sub-pixel region, the second sub-pixel region, the third sub-pixel region, and the fourth sub-pixel region have an equal area, and the two secondary sub-pixel regions in the fourth sub-pixel region have an equal area.

Preferably, in one of the pixel unit regions, color barriers having different colors from the color barrier having the largest thickness have a same thickness.

Preferably, in the first sub-pixel region, the second sub-pixel region, and the third sub-pixel region of one of the pixel unit regions, color barriers, arranged on two adjacent sub-pixel regions which are located at two sides of the sub-pixel region provided thereon with the color barrier having the largest thickness, are of different colors.

Further preferably, in one of the pixel unit regions, a sub-pixel region, provided thereon with a color barrier having a different color from the color barrier having the largest thickness, is located between the fourth sub-pixel region and the sub-pixel region provided thereon with the color barrier having the largest thickness, wherein colors of the color barriers provided on the secondary sub-pixel regions in the fourth sub-pixel region are respectively different from any one of colors of the color barriers provided on adjacent sub-pixel regions thereof.

In one specific embodiment of the present disclosure, the color filter substrate further comprises: a base plate; and a black matrix provided on the base plate, wherein a portion of the black matrix corresponding to an abutment of two adjacent color barriers is arranged between the color barriers and the base plate.

Preferably, the color filter substrate further comprises a flat layer, which is provided on the color barrier and on exposed black matrix.

Further preferably, the color filter substrate further comprises a transparent conductive layer, which is provided on the flat layer.

Preferably, the color filter substrate further comprises a photo spacer, which has a projection on the color filter substrate falling within a range where the black matrix is located.

Advantageous effects of the present disclosure are as follows.

The present disclosure can improve the color gamut of the color filter substrate by configuring the thickness of the color barrier in the sub-pixel region of a specific color to be larger than the thickness of the color barrier in the sub-pixel region of each of the other two colors. The fourth sub-pixel region including the sub-pixel regions of the color barriers of other two colors than the sub-pixel region corresponding to the color barrier having the largest thickness can be provided to balance the color shift of the color filter substrate.

Other advantages, objectives, and features of the present disclosure will be set forth to a certain extent, in the description which follows and, to a certain extent, will be apparent to those skilled in the art based on observational study of the following description, or may be taught from implementation of the present disclosure. The objectives and other advantages of the present disclosure may be realized and obtained by the structure particularly pointed out in the following description, claims, and drawings.

BRIEF DESCRIPTION OF THE DRAWINGS

The drawings are provided for further understanding of the technical solution of the present disclosure or the prior art, and constitute a part of the specification. The accompanying drawings, which illustrate the embodiments of the present disclosure, are used in conjunction with the embodiments of the present disclosure to explain the technical solution of the present disclosure without limiting the scope of the present disclosure. In the drawings.

DETAILED DESCRIPTION OF THE EMBODIMENTS

The present disclosure will be explained in detail with reference to the embodiments and the accompanying drawings, whereby it can be fully understood how to solve the technical problem by the technical means according to the present disclosure and achieve the technical effects thereof, and thus the technical solution according to the present disclosure can be implemented. It is important to note that as long as there is no structural conflict, all the technical features mentioned in all the embodiments may be combined in any manner, and the technical solutions obtained in this manner all fall within the scope of the present disclosure.

Figure 2:
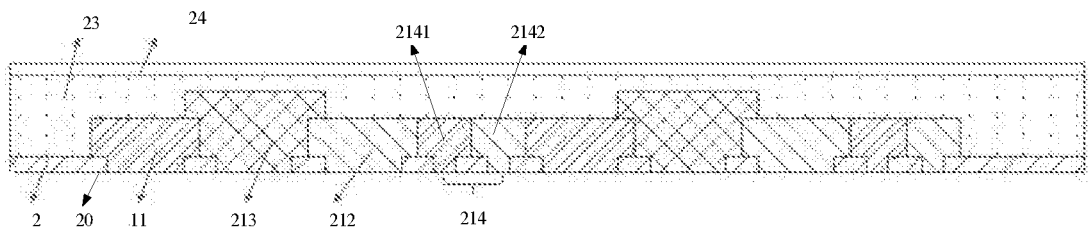
FIG. 2 schematically shows the structure a color filter substrate from a cross-sectional view according to one embodiment of the present disclosure.
Figure 3:
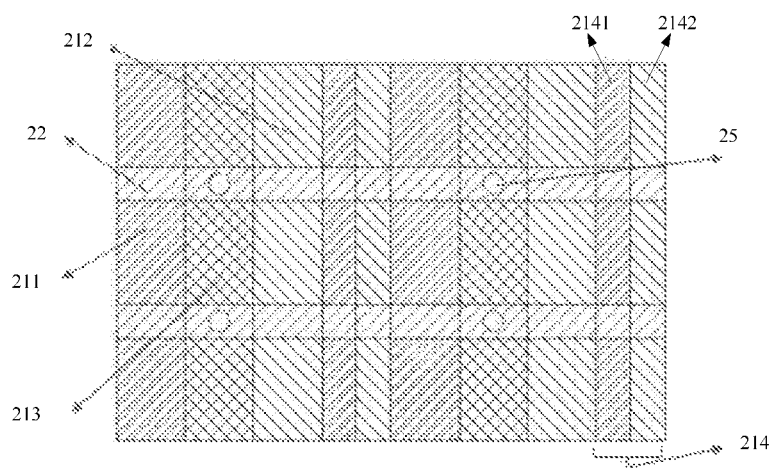
FIG. 3 schematically shows the structure a color filter substrate from a top view according to one embodiment of the present disclosure.

In order to improve color gamut of a color filter substrate using three primary colors of red, green, and blue in the prior art, the present disclosure provides a novel wide-color-gamut color filter substrate. FIG. 2 schematically shows the structure of a color filter substrate from a cross-sectional view according to one embodiment of the present disclosure, and FIG. 3 schematically shows a top view of FIG. 2. The present disclosure will be described in detail below with reference to FIGS. 2 and 3.

As shown in FIG. 2, the color filter substrate includes a plurality of pixel unit regions arranged in an array, each pixel unit region having a first sub-pixel region 211, a second sub-pixel region 212, and a third sub-pixel region 213, which are provided thereon with a red color barrier, a green color barrier, and a blue color barrier, respectively. In at least one of the pixel unit regions, thickness of a color barrier provided on a sub-pixel region corresponding to color of a specific color barrier is larger than thickness of a color barrier provided on a sub-pixel region corresponding to color of each of other two color barriers The present disclosure will be descried with the color barriers of the first sub-pixel region 211, the second sub-pixel region 212, and the third sub-pixel region 213 to be respectively red, green, and blue as an example, but the present disclosure is not limited thereto. For example, the thickness of the green color barrier of the second sub-pixel region 212 is configured to be larger both than that of the red color barrier of the first sub-pixel region 211, and that of the blue color barrier of the third sub-pixel region 213.

Figure 1:
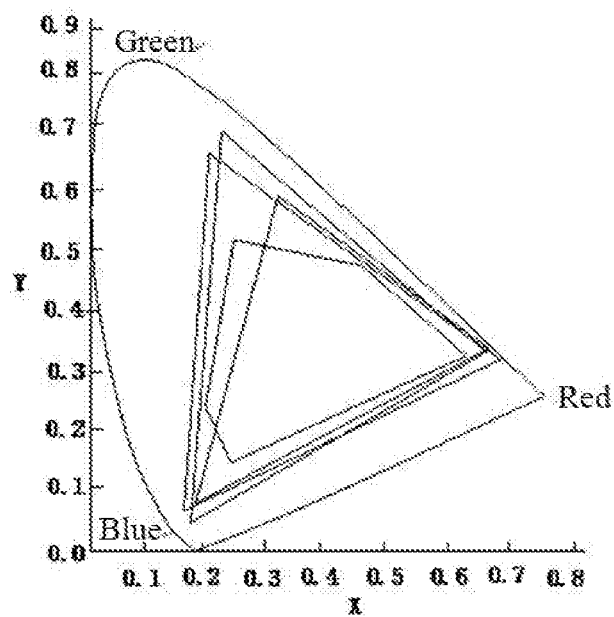
FIG. 1 is a diagram of color gamut based on three primary colors of red, green, and blue in the prior art.

In the present disclosure, thickness of a color barrier of a specific color can be increased, so as to increase the saturation of the specific color in the pixel unit region. That is, in a color gamut formed by connecting endpoints of the three primary colors in FIG. 1, an endpoint corresponding to the specific color moves to an outer side of the three primary colors. In other words, an area of the color gamut formed by the three primary colors increases, thereby increasing a color gamut range of the color filter substrate.

In one pixel unit region, increase in the saturation of only one monochromatic light, although can increase a gamut range, may result in color shift also. Thus, in one embodiment of the present disclosure, each pixel unit region further includes a fourth sub-pixel region 214, which has two secondary sub-pixel regions, provided thereon with color barriers having different colors from each other and from a color barrier having a largest thickness in the pixel unit region. For example, in one pixel unit region, when the color barrier having the largest thickness is green, the fourth sub-pixel region is configured to have two secondary sub-pixel regions, which are provided thereon with red color barrier and blue color barrier, respectively.

As shown in FIG. 2, the fourth sub-pixel region includes two secondary sub-pixel regions, i.e., a red secondary sub-pixel region 2141 and a blue secondary sub-pixel region 2142. Such being the case, in one pixel unit region, when the thickness of the green color barrier in the green sub-pixel region is both larger than the thickness of the red color barrier in the red sub-pixel region and also larger than the thickness of the blue color barrier in the blue sub-pixel region, thereby increasing the saturation of transmitted green color, the red color barrier corresponding to the red secondary sub-pixel region and the blue color barrier corresponding to the blue secondary sub-pixel region can be increased, so as to increase red color light and blue color light passing through the pixel unit region. The red color light and blue color light as increased are blended with green color light, so as to balance color shift caused by increase in saturation of green color light passing through the green sub-pixel region, thereby improving display effects of a panel.

In one embodiment of the present disclosure, color barriers of different colors from the color barrier of the largest thickness have a same thickness in one pixel unit region. Specifically, as shown in FIG. 2, the thickness of the color barrier in the green sub-pixel region is configured to be largest, and the thicknesses of the color barriers in the sub-pixel regions of other colors are configured to be equal to each other and smaller than the thickness of the color barrier in the green sub-pixel region. A specific ratio of the thickness of the color barrier of the green sub-pixel region to the thickness of the color barrier of each of the sub-pixel regions of other colors can be adjusted according to preset chromaticity. Of course, the thicknesses of the color barriers of said other color sub-pixel regions, while being smaller than the thickness of the color barrier of the green sub-pixel region, may be configured to be unequal to each other. Specific thickness ratio can be configured according to the preset chromaticity.

In one embodiment of the present disclosure, the first sub-pixel region, the second sub-pixel region, the third sub-pixel region, and the fourth sub-pixel region have an equal area, and the two secondary sub-pixel regions in the fourth sub-pixel region have an equal area. Specifically, as shown in FIG. 3, areas of the first sub-pixel region 211, the second sub-pixel region 212, the third sub-pixel region 213, and the fourth sub-pixel region 214 are configured to be equal to each other, and areas of the two secondary sub-pixel regions in the fourth sub-pixel region are also configured to be equal to each other. For example, an area of the green sub-pixel region, an area of the red sub-pixel region, an area of the blue sub-pixel region, and a sum area of the red and blue secondary sub-pixel regions (in the fourth sub-pixel region) may be configured to be equal to each other, and the red and blue secondary sub-pixel regions (in the fourth sub-pixel region) are configured to have an equal area. In manufacture of the sub-pixel regions of respective colors, one and a same mask is usually used to form the sub-pixel regions of the respective colors. It can facilitate technical realization to configure the areas of the first sub-pixel region, the second sub-pixel region, the third sub-pixel region, and the fourth sub-pixel region to be equal to each other. Of course, the areas of the first sub-pixel region, the second sub-pixel region, the third sub-pixel region, and the fourth sub-pixel region may be configured to be different from each other also, and the present disclosure is not limited thereto.

The areas of the first sub-pixel region, the second sub-pixel region, the third sub-pixel region, and the fourth sub-pixel region are configured to be equal to each other, and the areas of the two secondary sub-pixel regions in the fourth sub-pixel region are configured to be equal to each other, such that, in one pixel unit region, a total area of red pixels and a total area of blue pixels are respectively larger than an area of green pixels, and a specific ratio thereamong can be configured according to color barrier materials and thicknesses corresponding to the red, blue, and green pixels.

In one embodiment of the present disclosure, in the first sub-pixel region, the second sub-pixel region, and the third sub-pixel region of one pixel unit region, the sub-pixel region corresponding to the color barrier which has the largest thickness is arranged between the sub-pixel regions corresponding to other two colors of color barriers. For example, as shown in FIGS. 2 and 3, the thickness of the color barrier in the green sub-pixel region is configured to be both larger than the thickness of the color barrier in the red sub-pixel region, and larger the thickness of the color barrier in the blue sub-pixel region, and the green sub-pixel region is arranged between the red sub-pixel region and the blue sub-pixel region. This is advantageous to balance color shift caused by the increase in the thickness of the color barrier in the green sub-pixel region. Of course, it is also feasible to arrange the red sub-pixel region or the blue sub-pixel whose thickness is not the largest among the three sub-pixel regions between the other two colors of sub-pixel regions, and the present disclosure is not limited thereto.

In one embodiment of the present disclosure, in one pixel unit region, the fourth sub-pixel region is arranged at one side of one of the two sub-pixel regions corresponding to the color barriers not having the largest thickness, away from the sub-pixel region corresponding to the color barrier having the largest thickness, wherein the colors of the color barriers in the secondary sub-pixel regions of the fourth sub-pixel region are respectively different from the color of each of the color barriers in adjacent sub-pixel regions. For example, when the fourth sub-pixel region includes the red secondary sub-pixel region and the blue secondary sub-pixel region, and the green sub-pixel region is arranged between the red sub-pixel region and the blue sub-pixel region, if the fourth sub-pixel region is arranged adjacent to the blue sub-pixel region, then the red secondary sub-pixel region in the fourth sub-pixel region is close to the blue sub-pixel region. If the fourth sub-pixel region is arranged adjacent to the red sub-pixel region, then the blue secondary sub-pixel region in the fourth sub-pixel region is close to the red sub-pixel region, as shown in FIG. 3.

In one embodiment of the present disclosure, the color filter substrate further comprises a base plate and a black matrix 22 provided on the base plate. As shown in FIG. 2, the black matrix 22 is provided thereon with the first sub-pixel region 211, the second sub-pixel region 212, the third sub-pixel region 213, and the fourth sub-pixel region 214, for separating color barriers in sub-pixel regions of respective colors and improving contrast of respective colors of color barriers.

In one embodiment of the present disclosure, the color filter substrate further includes a flat layer 23, which is arranged on exposed black matrix 22 and on the color barriers corresponding to the first sub-pixel region 211, the second sub-pixel region 212, the third sub-pixel region 213, and the fourth sub-pixel region 214, as shown in FIG. 2. The flat layer 23 is used for planarizing the substrate that forms the first sub-pixel region, the second sub-pixel region, the third sub-pixel region, and the fourth sub-pixel region.

In one embodiment of the present disclosure, the color filter substrate further comprises a transparent conductive layer 24, which is provided on the flat layer 23, as shown in FIG. 2. A common voltage can be supplied to the transparent conductive layer 24, and work with an array substrate on a corresponding side, to realize rotation of liquid crystal molecules.

In one embodiment of the present disclosure, the color filter substrate further includes a photo spacer 25, which is provided on a portion of the black matrix 22 which is not covered by the color barriers corresponding to the first sub-pixel region 211, the second sub-pixel region 212, the third sub-pixel region 213, and the fourth sub-pixel region 214, so as to reduce an aperture ratio, as shown in FIG. 3. The photo spacer 25 is used to control a distance between the color filter substrate and a corresponding array substrate.

The present disclosure can improve the color gamut of the color filter substrate by configuring the thickness of the color barrier in the sub-pixel region of a specific color to be larger than the thickness of the color barrier in the sub-pixel region of each of the other two colors. The fourth sub-pixel region including the sub-pixel regions of the color barriers of other two colors than the sub-pixel region corresponding to the color barrier having the largest thickness can be provided to balance the color shift of the color filter substrate.

While the embodiments of the present disclosure are described above, the description should not be construed as limitations of the present disclosure, but merely as embodiments for readily understanding the present disclosure. Anyone skilled in the art, within the spirit and scope of the present disclosure, can make amendments or modification to the implementing forms and details of the embodiments. However, the scope of the present disclosure should still be subject to the scope defined in the claims.

The invention claimed is:

1. A color filter substrate, comprising a plurality of pixel unit regions arranged in an array, each of the pixel unit regions including a first sub-pixel region, a second sub-pixel region, a third sub-pixel region, and a fourth sub-pixel region, wherein,
   a red color barrier, a green color barrier, and a blue color barrier are provided on the first sub-pixel region, the second sub-pixel region, and the third sub-pixel region, respectively;
   in at least one of the pixel unit regions, thickness of a color barrier provided on a sub-pixel region corresponding to color of a specific color barrier is larger than thickness of a color barrier provided on a sub-pixel region corresponding to color of each of other two color barriers;
   the fourth sub-pixel region consists of two secondary sub-pixel regions, the two secondary sub-pixel regions are provided with color barriers having different colors from each other and from a color barrier having a largest thickness in the pixel unit region;
   in one of the pixel unit regions, a sub-pixel region, provided thereon with a color barrier having a different color from the color barrier having the largest thickness, is located between the fourth sub-pixel region and the sub-pixel region provided thereon with the color barrier having the largest thickness, wherein colors of the color barriers provided on the secondary sub-pixel regions in the fourth sub-pixel region are respectively different from any one of colors of the color barriers provided on adjacent sub-pixel regions thereof.

2. The color filter substrate according to claim 1, wherein the first sub-pixel region, the second sub-pixel region, the third sub-pixel region, and the fourth sub-pixel region have an equal area, and the two secondary sub-pixel regions in the fourth sub-pixel region have an equal area.

3. The color filter substrate according to claim 1, wherein in one of the pixel unit regions, color barriers having different colors from the color barrier having the largest thickness have a same thickness.

4. The color filter substrate according to claim 1, wherein in the first sub-pixel region, the second sub-pixel region, and the third sub-pixel region of one of the pixel unit regions, color barriers, arranged on two adjacent sub-pixel regions which are located at two sides of the sub-pixel region provided thereon with the color barrier having the largest thickness, are of different colors.

5. The color filter substrate according to claim 1, further comprising: a base plate; and a black matrix provided on the base plate, wherein a portion of the black matrix corresponding to an abutment of two adjacent color barriers is arranged between the color barriers and the base plate.

6. The color filter substrate according to claim 5, further comprising a flat layer, which is provided on the color barrier and on exposed black matrix.

7. The color filter substrate according to claim 6, further comprising a transparent conductive layer, which is provided on the flat layer.

8. The color filter substrate according to claim 5, further comprising a photo spacer, which has a projection on the color filter substrate falling within a range where the black matrix is located.

* * * * *